(12) United States Patent
Zhang

(10) Patent No.: US 10,293,957 B2
(45) Date of Patent: May 21, 2019

(54) ROTARY WING UNMANNED AERIAL VEHICLE AND PNEUMATIC LAUNCHER

(71) Applicant: Hanhui Zhang, Clarksburg, MD (US)

(72) Inventor: Hanhui Zhang, Clarksburg, MD (US)

( * ) Notice: Subject to any disclaimer, the term of this patent is extended or adjusted under 35 U.S.C. 154(b) by 194 days.

(21) Appl. No.: 15/419,979

(22) Filed: Jan. 30, 2017

(65) Prior Publication Data

US 2018/0215482 A1  Aug. 2, 2018

(51) Int. Cl.
*B64F 1/04* (2006.01)
*B64C 39/02* (2006.01)

(52) U.S. Cl.
CPC .............. *B64F 1/04* (2013.01); *B64C 39/024* (2013.01); *B64C 2201/024* (2013.01); *B64C 2201/027* (2013.01); *B64C 2201/08* (2013.01); *B64C 2201/108* (2013.01); *B64C 2201/146* (2013.01)

(58) Field of Classification Search
CPC ..... B64C 2201/084; F41B 11/72; F41B 11/80
See application file for complete search history.

(56) References Cited

U.S. PATENT DOCUMENTS

| 5,653,216 A * | 8/1997 | Johnson | A63H 27/005 124/69 |
|---|---|---|---|
| 6,808,436 B1 * | 10/2004 | Siu | A63H 27/005 124/38 |
| 7,410,124 B2 * | 8/2008 | Miller | B64C 39/024 124/65 |
| 7,789,341 B2 * | 9/2010 | Arlton | B64C 27/10 244/17.23 |
| 8,052,081 B2 * | 11/2011 | Olm | B64C 39/024 244/17.23 |
| 8,083,173 B2 * | 12/2011 | Arlton | B64C 39/024 244/17.23 |
| 8,505,430 B2 * | 8/2013 | Miralles | B64C 39/024 89/1.816 |
| 8,939,136 B2 * | 1/2015 | Gaus | F41F 7/00 124/4 |
| 9,004,393 B2 * | 4/2015 | Barrett-Gonzales | B64C 27/24 244/14 |
| 9,086,251 B2 * | 7/2015 | Cummings | F41B 11/50 |
| 9,434,471 B2 * | 9/2016 | Arlton | B64C 27/14 |
| 9,975,633 B1 * | 5/2018 | Johnson | B64C 39/024 |
| 2005/0051667 A1 * | 3/2005 | Arlton | B64C 27/10 244/17.11 |
| 2014/0299708 A1 * | 10/2014 | Green | B64C 27/32 244/17.23 |
| 2018/0133608 A1 * | 5/2018 | Young | A63H 27/14 |
| 2018/0170510 A1 * | 6/2018 | Brock | B64C 1/063 |

* cited by examiner

*Primary Examiner* — Brian M O'Hara
*Assistant Examiner* — Michael B. Kreiner
(74) *Attorney, Agent, or Firm* — SZDC LAW P.C.

(57) ABSTRACT

A rotary wing unmanned aerial vehicle and pneumatic launcher system includes a rotary wing unmanned aerial vehicle and a pneumatic launcher. The rotary wing unmanned aerial vehicle includes a pressure tube, a launch detector, and a center controller. The pressure tube has an open end and a closed end. The launch detector is coupled to the center controller and detects the launch of the rotary wing unmanned aerial vehicle. The pneumatic launcher includes a launch gas reservoir, a launch tube, and a release valve. The release valve is located between the launch gas reservoir and the launch tube. The gas reservoir holds launch gas. The launch tube is inserted into the pressure tube through the open end.

12 Claims, 8 Drawing Sheets

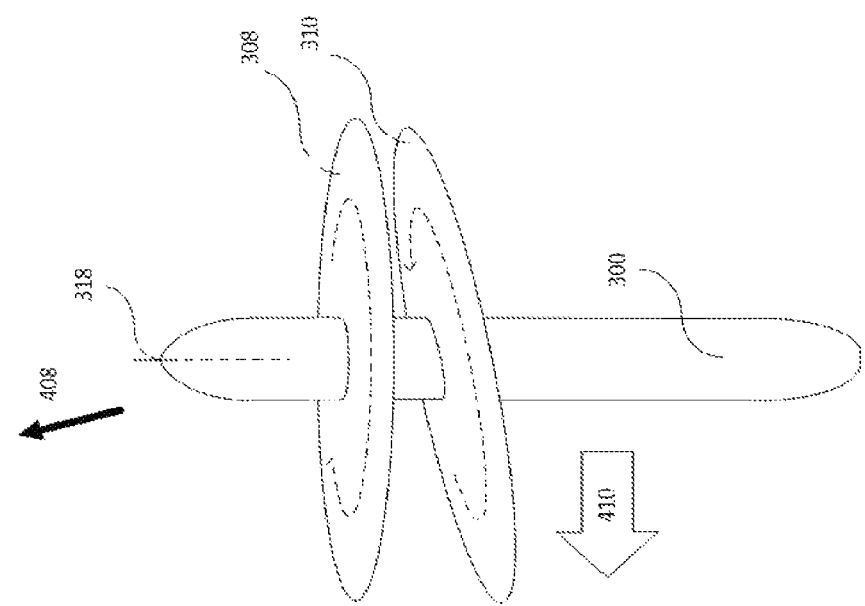
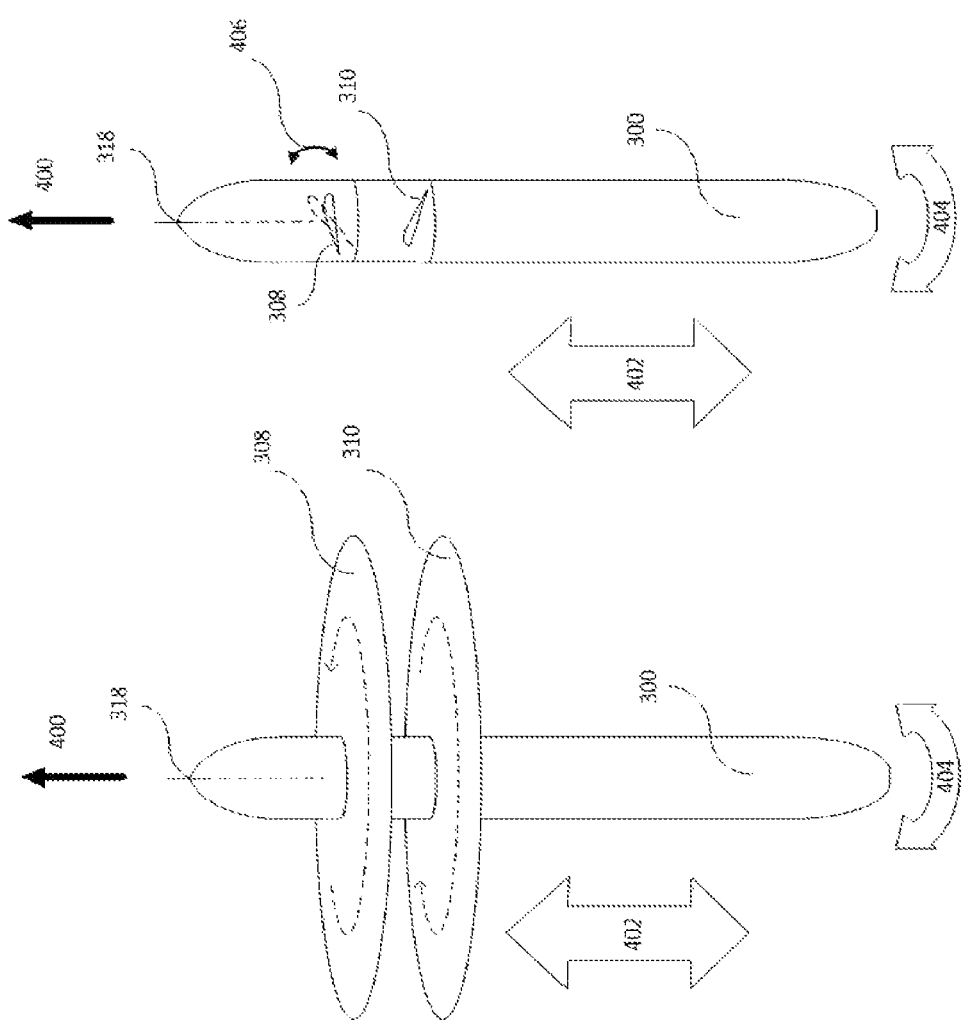

ROTARY WING UNMANNED AERIAL VEHICLE AND PNEUMATIC LAUNCHER

BACKGROUND OF THE INVENTION

Field of the Invention

The present invention relates to a rotary wing unmanned aerial vehicle and pneumatic launcher system and a method using the same.

Discussion of the Related Art

Unmanned aerial vehicles are gaining popularity and finding their way in surveillance, aero photography, and recreation. Wider adoption of unmanned aerial vehicles for such tasks depends upon many factors. Among them are ease and speed of deployment.

The most common rotary wing unmanned aerial vehicles usually demand a stable surface or platform for safe launch because they ascend to mission altitude in relative slow speed. Moreover, launching of a fleet of unmanned aerial vehicles is cumbersome.

There is a need to provide a safe, convenient and fast way to launch rotary wing unmanned aerial vehicles.

SUMMARY OF THE INVENTION

In one embodiment, a rotary wing unmanned aerial vehicle and pneumatic launcher system includes a rotary wing unmanned aerial vehicle and a pneumatic launcher. The rotary wing unmanned aerial vehicle includes a pressure tube, a launch detector, and a center controller. The pressure tube has an open end and a closed end. The launch detector is coupled to the center controller and detects the launch of the rotary wing unmanned aerial vehicle. The pneumatic launcher includes a launch gas reservoir, a launch tube, and a release valve. The release valve is located between the launch gas reservoir and the launch tube. The gas reservoir holds launch gas. The launch tube is inserted into the pressure tube through the open end. The release valve releases a portion of the launch gas via the launch tube, and the portion of the launch gas launches the rotary wing unmanned aerial vehicle. Upon detecting the launch of the rotary wing unmanned aerial vehicle, the launch detector activates the center controller to control the rotary wing unmanned aerial vehicle to a powered flight status.

In another embodiment, the rotary wing unmanned aerial vehicle further includes a first propeller and a second propeller; the first propeller rotates clockwise; and the second propeller rotates counter-clockwise.

In another embodiment, the rotary wing unmanned aerial vehicle further includes a first stacked propulsion unit and a second stacked propulsion unit; the first stacked propulsion unit includes a first propeller; the second stacked propulsion unit includes a second propeller; the first propeller rotates clockwise around a common axis of the rotary wing unmanned aerial vehicle; and the second propeller rotates counter-clockwise around the common axis.

In another embodiment, the rotary wing unmanned aerial vehicle further includes a throttle control, a collective pitch control and a cyclic pitch control.

In another embodiment, the rotary wing unmanned aerial vehicle further includes a remote control telemetry system, a plurality of flight sensors, and a plurality of motor and servo controllers.

In another embodiment, the pneumatic launcher further includes a trigger; and the trigger opens the release valve to release the portion of the launch gas.

In another embodiment, the launch gas is selected from the group consisting of air, nitrogen, carbon dioxide, and helium.

In one embodiment, a method of launching a rotary wing unmanned aerial vehicle a launch detector and a center controller includes: providing a pneumatic launcher, the pneumatic launcher holding launch gas; placing the rotary wing unmanned aerial vehicle in a launch angle θ, the launch angle θ being an angle between the launch tube and a horizontal ground; setting the rotary wing unmanned aerial vehicle in an initialization state, the center controller being booted up; setting the rotary wing unmanned aerial vehicle in an standby state; releasing the launch gas, the launch gas launching the rotary wing unmanned aerial vehicle; detecting the release of the launch gas; and transiting the rotary wing unmanned aerial vehicle to a powered flight state.

In another embodiment, the rotary wing unmanned aerial vehicle includes a launch detector and a center controller.

In another embodiment, the method further includes detecting the release of the launch gas by the launch detector; and activating the center controller by the launch detector to control the rotary wing unmanned aerial vehicle to transit to the powered flight state.

In another embodiment, the launch angle θ ranges from 45° to 90°.

In another embodiment, the launch gas is selected from the group consisting of air, nitrogen, carbon dioxide, helium, and a gas generated by a combustible chemical.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3A illustrates throttle control of a rotary wing unmanned aerial vehicle. FIG. 3B illustrates a collective pitch control of a rotary wing unmanned aerial vehicle. FIG. 3C illustrates a cyclic pitch control of a rotary wing unmanned aerial vehicle.

DETAILED DESCRIPTION OF THE ILLUSTRATED EMBODIMENTS

Reference will now be made in detail to embodiments of the present invention, example of which is illustrated in the accompanying drawings.

The present invention provides a rotary wing unmanned aerial vehicle and pneumatic launcher system. The system uses pressurized gas to propel the rotary wing unmanned aerial vehicle into certain altitude. The unmanned aerial vehicle starts its rotary system during the ascending in order to transit to a self-sustaining powered flight.

Advantageously, the system forms a compact unit that is easily deployed, and the rotary wing unmanned aerial vehicle can be deployed to a mission altitude rapidly without the demand of launch surface and lengthy preparation. The system can be reused to launch multiple unmanned aerial vehicles within a relatively short period of time.

Figure 1:
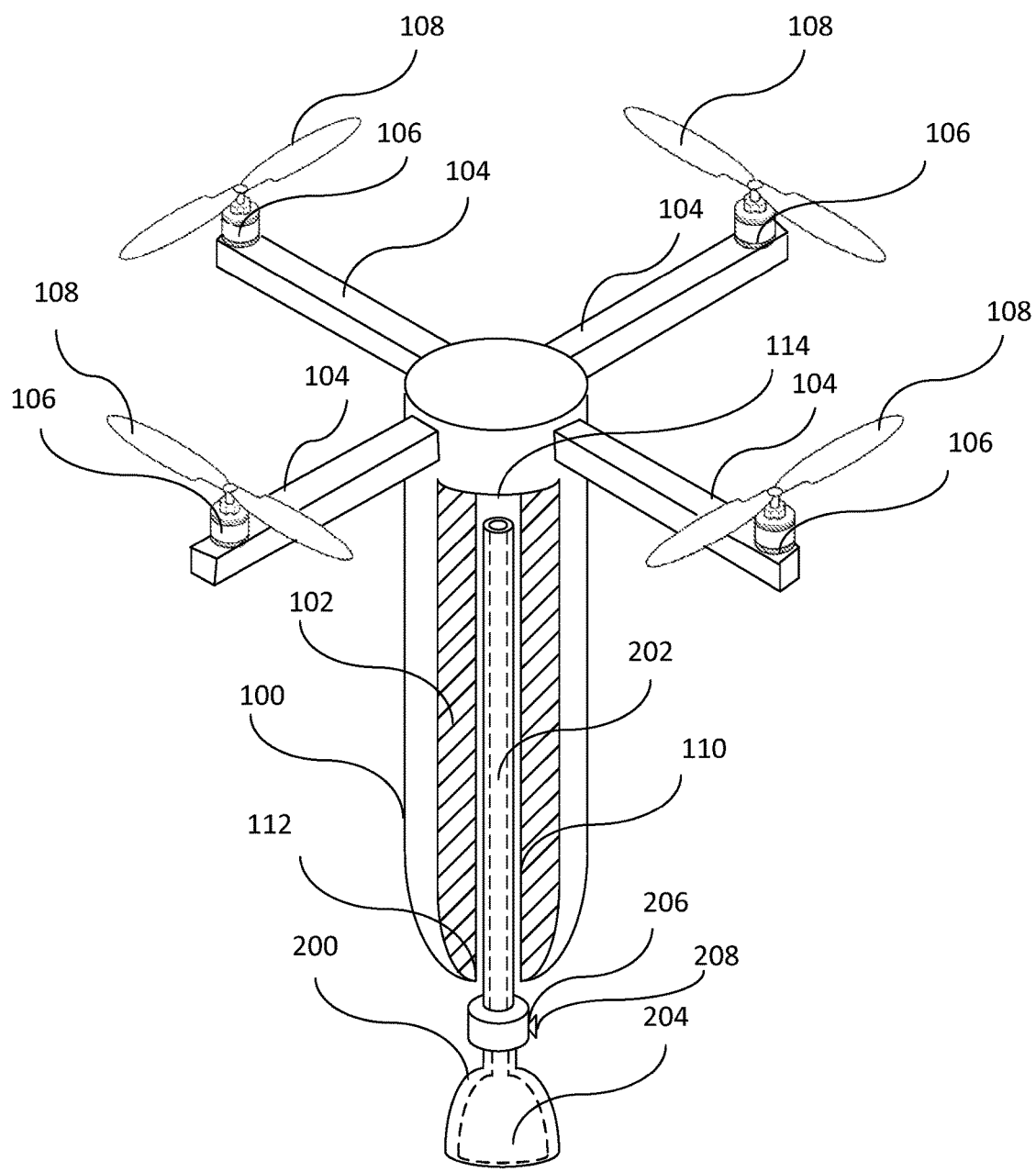
FIG. 1 is a schematic sectional view of a rotary wing unmanned aerial vehicle and pneumatic launcher system. The rotary wing system unmanned aerial vehicle has a quad-copter (four rotors) configuration.

FIG. 1 is a schematic sectional view of a rotary wing unmanned aerial vehicle and pneumatic launcher system. The system includes an unmanned aerial vehicle 100 and a launcher 200.

The unmanned aerial vehicle 100 has a central fuselage 102 from which radiate four of support arms 104. Each support arm 104 is equipped at its distal end with a propulsion unit comprising a motor 106 driving into rotation a propeller 108. Preferably, each propeller rotates on a plane perpendicular to an axis of the central fuselage 102. The unmanned aerial vehicle 100 has a pressure tube 110 that has an open end 112 and a closed end 114.

The launcher 200 has a launch tube 202. The pressure tube 110 receives the launch tube 202 of the launcher 200. The pressure tube 110 is the interface of energy transfer between the launcher 200 and the unmanned aerial vehicle 100. The launcher 200 has a launch gas reservoir 204 that stores pressurized launch gas (hereafter, "launch gas") used to propel the unmanned aerial vehicle during the launch. Appropriate pressurized gases include, but are not limited to, air, nitrogen, $CO_2$ and helium. The launch gas reservoir 204 is operationally connected to the launch tube 202.

Four of the propellers 108 are such configured that two of them rotate clockwise and the other two rotate counterclockwise, forcing air downward and lifting the unmanned aerial vehicle in an upwardly direction. Independent control on the rotation speed of each propeller is applied. By varying the rotation speed of each propeller, it is possible to specifically generate a desired total thrust; to locate the center of thrust both laterally and longitudinally; and to create a desired total torque, or turning force.

Although the unmanned aerial vehicle in FIG. 1 is illustrated having four propulsion units, the unmanned aerial vehicle may have two, three, or more rather than four propulsion units as performance and mission demands require.

Figure 2:
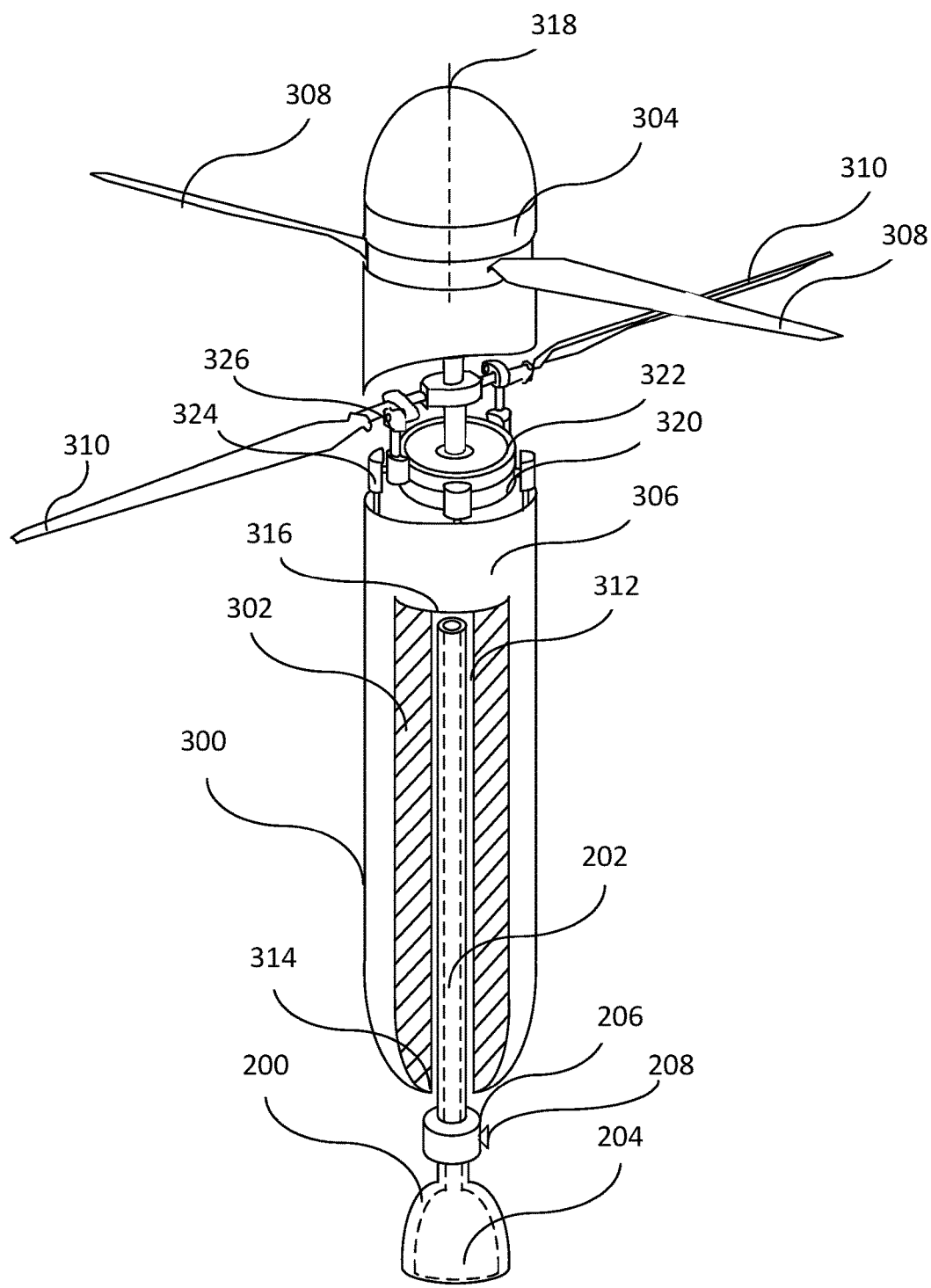
FIG. 2 is a schematic sectional view of another rotary wing unmanned aerial vehicle and pneumatic launcher system. The rotary wing unmanned aerial vehicle has a coaxial multi-rotor configuration.

FIG. 2 shows another a rotary wing unmanned aerial vehicle and pneumatic launcher system. The system includes an unmanned aerial vehicle 300 and a launcher 200.

The unmanned aerial vehicle 300 has a central fuselage 302 and first stacked propulsion unit 304 and second stacked propulsion unit 306. The first stacked propulsion unit 304 has first propeller 308 and second stacked propulsion unit 306 has second propeller 310. The first propeller 308 and second propeller 310 are configured to counter-rotate around a common axis 318 of the unmanned aerial vehicle, forcing air downward and lifting the unmanned aerial vehicle in an upwardly direction. The first stacked propulsion unit 304 and the second stacked propulsion unit 306 are equipped with a throttle control (varying the rotation speed of at least one propeller), and a swash plate structure to control the collective pitch (varying the angle of attack of at least one propeller) and a cyclic pitch (vary the angle of the rotation plane of at least one propeller with respect to the central fuselage 302). The swash plate structure comprises a stationary swash plate 320, rotating swash plate 322, a plurality of control rods 324 and a plurality of pitch links 326. The control rods control the titling and vertical movement of the swash plates 320 and 322. The pitch links convert the vertical movement of the rotating swash plate 322 into the angle of attack variation of the propeller blades, which in turn controls the collective pitch. The titling of the rotating swash plate 322 is converted to the titling of propeller blades' rotation plane, which in turn controls the cyclic pitch. The common axis 318 is orientated substantially vertically during the powered flight.

FIG. 3A illustrates the working principle of the throttle control. First propeller 308 and second propeller 310 rotate to generate a total vertical lift force. Arrow 400 shows the direction of the total aerodynamic lift force generated by first propeller 308 and second propeller 310 in this case. Varying the propellers' rotation speed at the same rate enables the unmanned aerial vehicle 300 to change its altitude. Arrow 402 illustrates the vertical movement of the unmanned aerial vehicle 300 in this case. Rotating first propeller 308 and second propeller 310 at different rate leads to the rotation of the unmanned aerial vehicle 300 around the vertical axis 318. Arrow 404 illustrates the rotation of the unmanned aerial vehicle 300.

FIG. 3B illustrates the working principle of the collective pitch control. For at least one of propeller 308 and second propeller 310, by varying their angle of attack as illustrated as 406, the lift force and drag force generated by the propeller can be changed to affect the vertical movement 400 and rotation 404 of the unmanned aerial vehicle 300. The throttle control and collective pitch control can work together to produce the desired vertical movement 400 and rotation 404.

FIG. 3C illustrates the working principle of a cyclic pitch control. For at least one of first propeller 308 and second propeller 310, the rotation angle can be titled to a certain direction, which enables the horizontal movement of the unmanned aerial vehicle 300 to that direction. Arrow 408 shows the direction of the total aerodynamic force generated by first propeller 308 and second propeller 310 in this case. Arrow 410 illustrates the movement of the unmanned aerial vehicle 300 as the result of the titling.

Although the unmanned aerial vehicle in FIG. 2 is illustrated having two propulsion units, the unmanned aerial vehicle may have more than two propulsion units as performance and mission demands require.

As shown in FIG. 2, the unmanned aerial vehicle 300 has a pressure tube 312 that has an open end 314 and a closed end 316. The pressure tube 312 receives a launch tube 202 of launcher 200, and is the interface of energy transfer between launcher 200 and the unmanned aerial vehicle 300. The launcher 200 has a launch gas reservoir 204 that stores a gas used to propel the unmanned aerial vehicle 300 during launch. The launch gas reservoir 204 is operationally connected to the launch tube 202.

In some embodiments, for example in FIG. 1 and FIG. 2, a release valve 206 is located between the launch gas reservoir 204 and the launch tube 202 to allow an operator to control over the release of the pressurized gas from the launch gas reservoir 204 to the launch tube 202. The release valve 206 is closed before the launch in order to stop the pressured gas from entering the launch tube 202. A trigger 208 can open the release valve 206. When the trigger 208 is activated, which in turn opens the release valve 206, the launch gas in the launch gas reservoir 204 is released into the launch tube 202 and propels the unmanned aerial vehicle to launch.

In some other embodiments, no release valve is located between the launch gas reservoir 204 and the launch tube 202. Combustible chemicals, such as gun power, can be ignited in the launch gas reservoir 204 during the launch. The hot gas generated by the combustion is released into the launch tube 202 and forces the unmanned aerial vehicle to launch.

Figure 4:
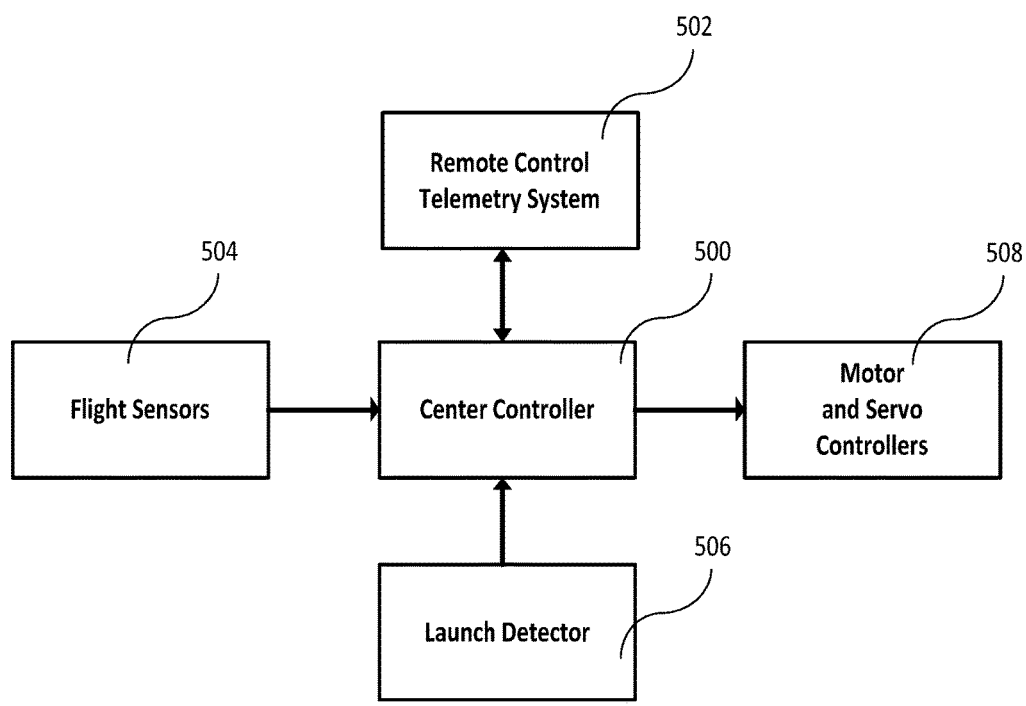
FIG. 4 is a block diagram of a flight controlling system of a rotary wing unmanned aerial vehicle.

The unmanned aerial vehicle can be equipped with an on-board flight controlling system. FIG. 4 is a schematic illustration by way of block diagram of the flight controlling system of the unmanned aerial vehicle. The flight controlling system can be used in combination with any suitable embodiment of the systems, devices, and methods disclosed herein. The flight controlling system can include a center controller 500, a remote control telemetry system 502, a plurality of flight sensors 504, a launch detector 506, and a plurality of motor and servo controllers 508.

The remote control telemetry system 502 provides overall control of the unmanned aerial vehicle from a ground control station. The remote control telemetry system 502 receives data from the ground control station relating to desired flight parameters, such as desired altitudes, speeds, attitudes and so on, as well as provides feedback to the ground control station of the vehicle's current situation.

A plurality of flight sensors 504 collect information relating to the unmanned aerial vehicles flight status and its environment. The sensors can include GPS sensor, gyroscope, accelerometer, compass, camera and so on. The flight sensors 504 can be operatively coupled to the center controller 500 and provide their measurements and data, such as GPS location, air speed, acceleration and attitude to the center controller 500 as inputs of the flight controlling algorithm or as the feedback to the ground control station.

The center controller 500 can be operatively coupled to a plurality of motor and servo controllers 508, which in turn, control a plurality of motors and servos. During and after the launch, a flight controlling algorithm in the center controller 500 processes commands from the remote control telemetry system 502 and measurements and data provided by a plurality of sensors 504 in order to generate the commands to motor and servo controllers 508 to control the unmanned aerial vehicle. For example, the motor and servo controllers 508 can be configured to control the rotation of one or more motors and the motion of one or more servos to stabilize the unmanned aerial vehicle and adjust its spatial disposition, velocity, flight orientation and so on during the ascending process and powered flight.

A launch detector 506 is operatively coupled to the center controller 500, senses any or combination of events that indicating the launch of the unmanned aerial vehicle. Those events include, but not limited to, the opening of the release valve 206, the abrupt change of the pressure in the pressure tube (110 in FIG. 1 or 312 in FIG. 2), the abrupt change in the acceleration of the unmanned aerial vehicle, the detachment of the unmanned aerial vehicle from the launch tube 202, the unmanned aerial vehicle gaining certain altitude and so on. Up on detecting the launch, the launch detector 506 triggers the center controller 500 to manage the transition to the powered flight.

Figure 5:
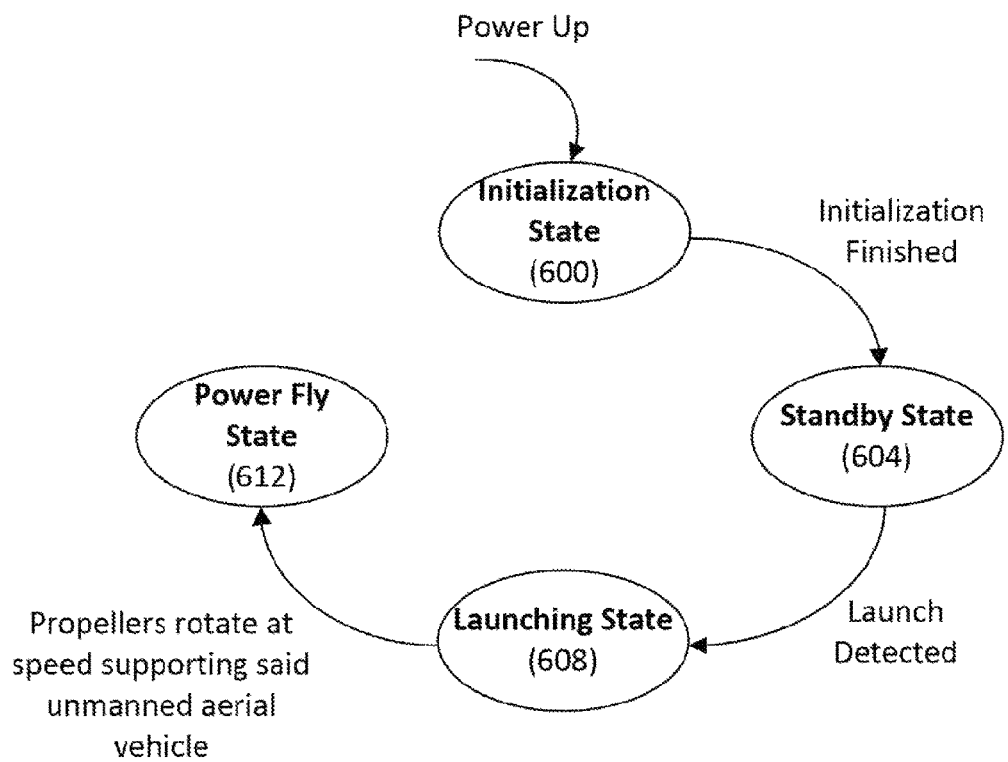
FIG. 5 shows the transition of a rotary wing unmanned aerial vehicle among different states during a launch process.

FIG. 5 shows a state diagram of the unmanned aerial vehicle 100 or 300 during the launch procedure and the events triggering the state transitions. Upon the power up, the unmanned aerial vehicle enters into an initialization state 600, in which a plurality of initialization procedures takes place. These procedures include booting up of the center controller 500, initializations and calibrations of the flight sensors 504 and so on. When all the initialization procedures finish, the unmanned aerial vehicle transits to a standby state 604, in which the unmanned aerial vehicle awaits for the launch. When the launch detector 502 senses the launch, the center controller 500 may wait for a certain period of time, then initiates the rotation of the motors to generate lift force. Also, the flight status information is collected from the flight sensors 504. The center controller 500 computes and sends the control command to the motor and servo controllers 508 to stabilize the unmanned aerial vehicle during the ascending process. When the unmanned aerial vehicle can be aerodynamically self-sustained by its own rotary wing system, the unmanned aerial vehicle enters into a powered fly state 612.

Figures 6, 7:
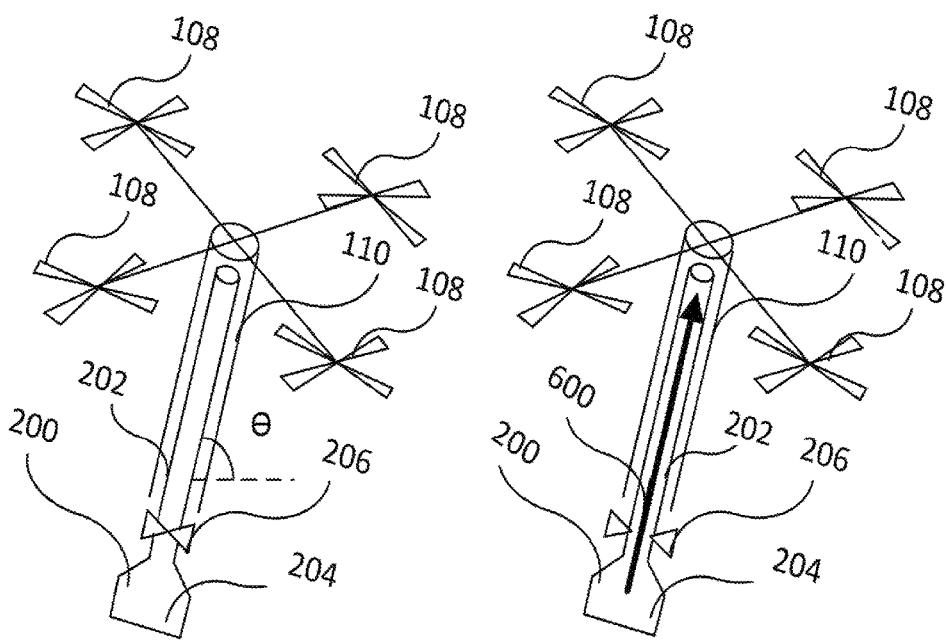
FIGS. 6-9 show various stages in a launch process.

An example of a typical launch sequence is shown in FIGS. 6-9. FIG. 6 is a simplified view of the system (similar to the embodiment shown in FIG. 1) immediately prior to launch. With the release valve 206 closed, pressurized gas fills the launch gas reservoir 204. The launch tube 202 of the launcher 200 is placed inside the pressure tube 110 of the unmanned aerial vehicle 100. The unmanned aerial vehicle 100 is in standby state 604 and ready for launch with a launch angle θ. A launch angle θ is the angle between the pressure tube and a horizontal ground. Preferably, the launch angle θ range from π/2 to π/4 (90° to 45°). More preferably, the launch angle θ range from 85° to 50°, 80° to 50°, 80° to 55°, 75° to 50°, 75° to 55°, 70° to 55°, 70° to 60°, or 70° to 65°.

FIG. 7 is a view of the system shortly after the release valve 206 is opened and a portion of the launch gas is allowed to transfer from the launch gas reservoir 204 to the launch tube 202. In this view, the unmanned aerial vehicle has moved relative to the launch tube 202 under the force exerted on the closed end 114 of the pressure tube 110 by the portion of the launch gas that has moved from the launch tube 202 into the pressure tube 110. The arrow 600 in FIG. 7 represents the movement of the launch gas from the launch tube 202 into the pressure tube 110.

Figure 8:
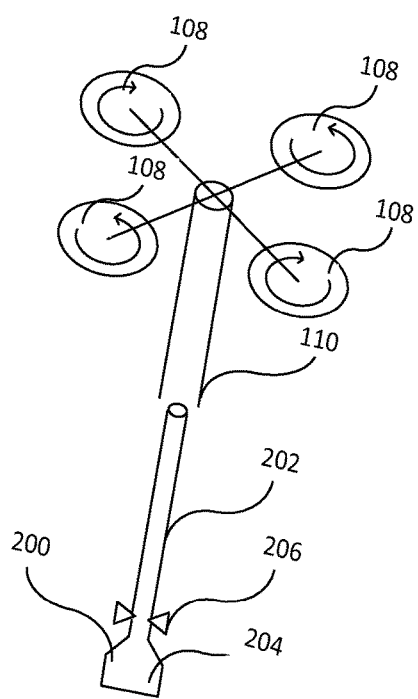

FIG. 8 shows the pressure tube 110 clearing the end of launch tube 202. The unmanned aerial vehicle will be detached from the launcher 200. After the unmanned aerial vehicle 100 has detected the launch, the motors start to drive the propellers 108 to generate lift force. The unmanned aerial vehicle 100 is entering into powered flight state 612.

Figure 9:
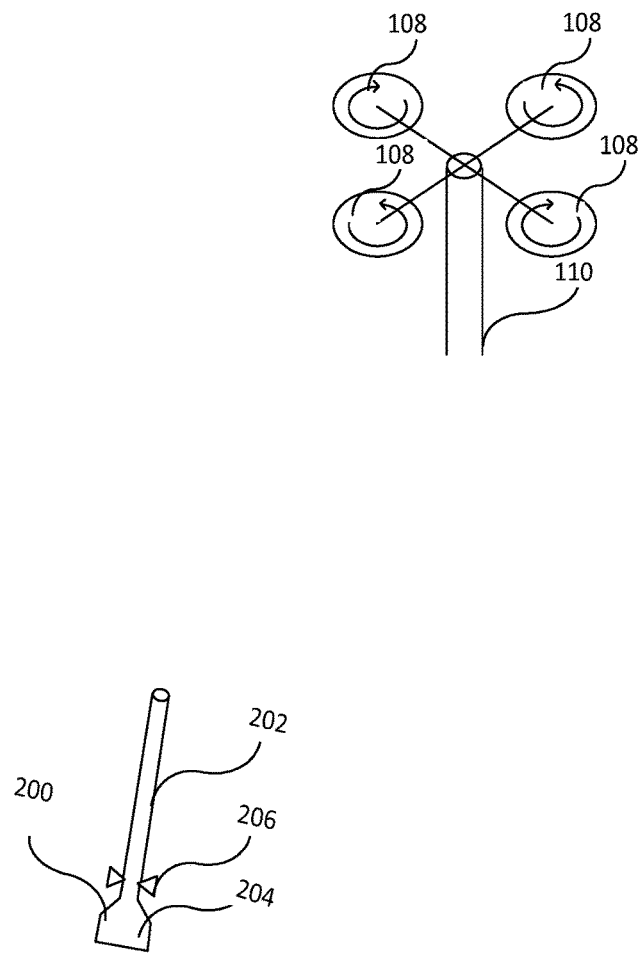

As shown in FIG. 9, during the transition from the launching state 608 to the powered flight state 612, the throttle, the cyclic and collective pitches can be varied to achieve desired operational characteristics relating to at least one of speed, attitude and altitude in any and all combinations. Preferably, the orientation of the unmanned aerial vehicle 100 is changed from an initial launch angle θ to an upright position close to π/2 (90°) to the horizontal in order to sustain aero-dynamical stability of the aerial vehicle 100. Once the propellers are at speed supporting the unmanned aerial vehicle 100, the aerial vehicle 100 is ready for pre-stored task or receiving command and control instructions from the ground control station. The unmanned aerial vehicle 100 will be in powered flight state 612 thereafter.

Figure 10:
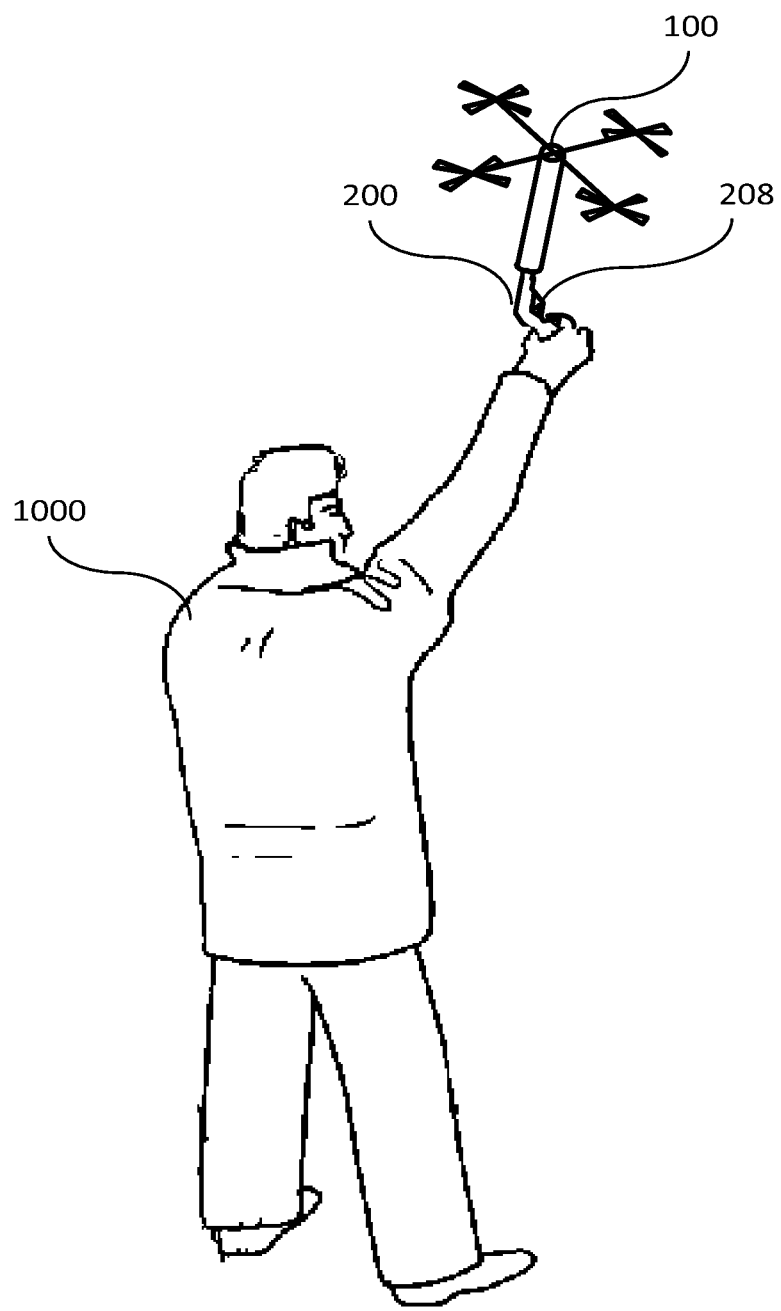
FIG. 10 shows a simplified full-scale launch scenario: a launch staff holding a launcher connected with a rotary wing unmanned aerial vehicle upright before triggering the launch.

FIG. 10 shows a simplified overall launch scenario. An operator 1000 holds a handle extended from the launcher 200 and positions the launcher 200 to an upright direction with intended initial launch angle θ. The pressure tube (110 in FIG. 1 or 312 in FIG. 2) of the unmanned aerial vehicle receives the launch tube 202 of the launcher 200, and the unmanned aerial vehicle is in the standby state 604. When the operator 1000 activates the trigger 208 and opens the release valve 206, the unmanned aerial vehicle is propelled upward by pressurized gas and begins transition to the launching state 608 and then the powered flight state 612. Right after the first unmanned aerial vehicle enters the powered flight state 612, the operator 1000 can close the release valve 206, recharge the launch gas reservoir 204 with pressurized gas from a external pressure source and arm the launcher 200 with another unmanned aerial vehicle of similar embodiment as shown in FIG. 1 or FIG. 2, and get ready for the next round launch.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A rotary wing unmanned aerial vehicle and pneumatic launcher system comprising:
    a rotary wing unmanned aerial vehicle comprising a pressure tube, a launch detector, and a center controller, the pressure tube having an open end and a closed end, the launch detector being coupled to the center controller and detecting the launch of the rotary wing unmanned aerial vehicle; and
    a pneumatic launcher comprising a launch gas reservoir, a launch tube, and a release valve, the release valve being located between the launch gas reservoir and the launch tube, the gas reservoir holding launch gas,
    wherein the launch tube is configured to be inserted into the pressure tube through the open end;
    wherein the release valve releases a portion of the launch gas via the launch tube, and the portion of the launch gas launches the rotary wing unmanned aerial vehicle; and
    wherein upon detecting the launch of the rotary wing unmanned aerial vehicle, the launch detector activates the center controller to control the rotary wing unmanned aerial vehicle to a powered flight status.

2. The rotary wing unmanned aerial vehicle and pneumatic launcher system of claim 1, wherein the rotary wing unmanned aerial vehicle further comprises a first propeller and a second propeller; the first propeller rotates clockwise; and the second propeller rotates counter-clockwise.

3. The rotary wing unmanned aerial vehicle and pneumatic launcher system of claim 1, wherein the rotary wing unmanned aerial vehicle further comprises a first stacked propulsion unit and a second stacked propulsion unit; the first stacked propulsion unit includes a first propeller; the second stacked propulsion unit includes a second propeller; the first propeller rotates clockwise around a common axis of the rotary wing unmanned aerial vehicle; and the second propeller rotates counter-clockwise around the common axis.

4. The rotary wing unmanned aerial vehicle and pneumatic launcher system of claim 3, wherein the rotary wing unmanned aerial vehicle further comprises a throttle control, a collective pitch control and a cyclic pitch control.

5. The rotary wing unmanned aerial vehicle and pneumatic launcher system of claim 1, wherein the rotary wing unmanned aerial vehicle further comprises a remote control telemetry system, a plurality of flight sensors, and a plurality of motor and servo controllers.

6. The rotary wing unmanned aerial vehicle and pneumatic launcher system of claim 1, wherein the pneumatic launcher further comprises a trigger; and the trigger opens the release valve to release the portion of the launch gas.

7. The rotary wing unmanned aerial vehicle and pneumatic launcher system of claim 1, wherein the launch gas is selected from the group consisting of air, nitrogen, carbon dioxide, and helium.

8. A method of launching a rotary wing unmanned aerial vehicle having a center controller and a pressure tube, the pressure tube having an open end and a closed end, comprising:
    providing a pneumatic launcher having a launch tube, the pneumatic launcher holding a launch gas;
    inserting the launch tube of the rotary wing unmanned aerial vehicle into the pressure tube of the pneumatic launcher through said open end;
    placing the rotary wing unmanned aerial vehicle in a launch angle $\theta$, the launch angle $\theta$ being an angle between the launch tube and a horizontal ground;
    setting the rotary wing unmanned aerial vehicle in an initialization state, the center controller being booted up;
    setting the rotary wing unmanned aerial vehicle in a standby state;
    releasing the launch gas, the launch gas launching the rotary wing unmanned aerial vehicle;
    detecting the release of the launch gas; and
    transiting the rotary wing unmanned aerial vehicle to a powered flight state.

9. The method of claim 8, wherein the rotary wing unmanned aerial vehicle comprises a launch detector.

10. The method of claim 9, further comprising:
    detecting the release of the launch gas by the launch detector; and
    activating the center controller by the launch detector to control the rotary wing unmanned aerial vehicle to transit to the powered flight state.

11. The method of claim 8, wherein the launch angle $\theta$ ranges from 45° to 90°.

12. The method of claim 8, wherein the launch gas is selected from the group consisting of air, nitrogen, carbon dioxide, helium, and a gas generated by a combustible chemical.

* * * * *